(12) United States Patent
Mullet et al.

(10) Patent No.: US 8,065,039 B2
(45) Date of Patent: Nov. 22, 2011

(54) CONTROL FOR POSITIONING MULTIPLE BARRIERS APPARATUS AND METHOD

(75) Inventors: Willis Jay Mullet, Gulf Breeze, FL (US); Ben L. Garcia, Cumming, GA (US); Douglas Real, Pensacola, FL (US); Yan Rodriguez, Suwanee, GA (US); Richard Bardin, Milton, FL (US)

(73) Assignee: HomeRun Holdings Corporation, Pensacola, FL (US)

( * ) Notice: Subject to any disclaimer, the term of this patent is extended or adjusted under 35 U.S.C. 154(b) by 463 days.

(21) Appl. No.: 12/245,019

(22) Filed: Oct. 3, 2008

(65) Prior Publication Data

US 2010/0087958 A1    Apr. 8, 2010

(51) Int. Cl.
G05B 13/00    (2006.01)
G05B 5/00     (2006.01)
G05B 11/01    (2006.01)

(52) U.S. Cl. ............................ 700/279; 318/467; 700/13
(58) Field of Classification Search ................... 700/13, 700/279; 318/466, 685, 467
See application file for complete search history.

(56) References Cited

U.S. PATENT DOCUMENTS

| | | | | |
|---|---|---|---|---|
| 4,825,133 | A * | 4/1989 | Tanuma et al. | 318/113 |
| 5,467,808 | A   | 11/1995 | Bell | |
| 5,905,442 | A   | 5/1999 | Mosebrook et al. | |
| 6,020,829 | A   | 2/2000 | Hormann | |
| 6,069,465 | A   | 5/2000 | de Boois et al. | |
| 6,212,221 | B1  | 4/2001 | Wakayama et al. | |
| 6,392,558 | B1 * | 5/2002 | Schulmeyer et al. | 340/825.52 |
| 6,646,399 | B2 * | 11/2003 | Kitamura | 318/445 |
| 6,879,122 | B1 * | 4/2005 | Stewart et al. | 318/280 |
| 6,891,838 | B1 * | 5/2005 | Petite et al. | 370/401 |
| 6,967,565 | B2  | 11/2005 | Lingemann | |
| 6,983,783 | B2 * | 1/2006 | Carmen et al. | 160/120 |
| 7,147,164 | B1 * | 12/2006 | Burma | 235/472.02 |
| 7,193,502 | B2 * | 3/2007 | Vandrunen et al. | 340/5.71 |
| 7,240,716 | B2  | 7/2007 | Nichols, Jr. et al. | |
| 7,299,848 | B2  | 11/2007 | Streib et al. | |
| 7,315,143 | B2 * | 1/2008 | Mullet et al. | 318/280 |
| 7,346,016 | B2  | 3/2008 | Nielsen et al. | |
| 7,356,041 | B2  | 4/2008 | Nielsen et al. | |
| 2002/0161456 | A1 * | 10/2002 | Mayer | 700/13 |

* cited by examiner

*Primary Examiner* — Kidest Bahta
*Assistant Examiner* — Sivalingam Sivanesan
(74) *Attorney, Agent, or Firm* — Baker & Hostetler LLP (57) ABSTRACT

A control routine for groups of remotely controlled, variable-position, position-aware, transceiver-equipped actuators manages data discrepancies by issuing a first set of generic actuation commands to start and stop the actuators, then polling the actuators to report their achieved positions. The routine then applies a rule to determine a preferred position value from among the reports and issues a second set of position-specific actuation commands to all of the actuators. The routine can further poll the actuators to confirm the extent to which the commands have been realized, and can retain and apply compensation factors for performance deviations in the individual actuators. The routine can further manage multiple groups of actuators, dissimilar activators within groups, assignment of an actuator to more than one group, and application of variable control factors as inputs modifying the rule applied by the routine for determining the commands to be issued.

12 Claims, 5 Drawing Sheets

CONTROL FOR POSITIONING MULTIPLE BARRIERS APPARATUS AND METHOD

FIELD OF THE INVENTION

The present invention relates generally to home automation control functions. More specifically, the invention relates to ganged positioning of window coverings and analogous automated control processes.

BACKGROUND OF THE INVENTION

Home automation control systems have established a growing industry and can be expected to persist as controller devices, programming methods, function concepts, and communication technologies advance in capability and decline in incremental cost to market. Particular functions continue to extend capability of existing products, adding and refining convenience, security, safety, and enjoyment features.

Among potential beneficial improvements in home automation functionality are apparatus and methods capable of providing substantially simultaneous operation of multiple motor-driven devices. Known devices provide incomplete realization of such functionality. For example, barrier positioners that are motorized, can exhibit varying condition of operation as a consequence of manufacturing tolerances, age, wear, bearing condition, battery state, and other factors. A home automation controller that relies on previous designs to command several barrier positioners simultaneously to first start, then run, then stop in a uniform fashion is unlikely to perform these functions consistently over product life. The consequences of uncertain start delay, nonuniform run speed, and variable response to stop commands include uneven appearance after stopping except at ends of travel (i.e., full up and full down positions), undesirable at least in a high-end consumer product.

What is needed is an apparatus or method that can ensure highly uniform action of multiple, separately-installed actuator devices at least in a home automation environment.

SUMMARY OF THE INVENTION

The above needs are met to a large extent by apparatus and methods in accordance with the present invention, wherein multiple home automation devices can realize uniform net operation despite variability in individual actuation characteristics, through enhanced operational control.

In one embodiment, a method for operating a plurality of autonomous, processor-controlled, multi-position actuators in unison from a separate control station is presented. The method includes establishing a wireless communication network that originates with the separate control station and provides bidirectional message transfer between the separate control station and each multi-position actuator, assigning a processor-readable address to each multi-position actuator, and providing a command set for each of the plurality of multi-position actuators that includes for each command in the command set the assigned actuator address and one of a plurality of executable functions. The command set includes at least one command to realize one position value from a plurality of position values defined for the actuator, and at least one stop command. The method further includes assigning the plurality of multi-position actuators to a group, and defining a plurality of group commands, including in each group command a plurality of discrete commands to perform a like executable function, directed to the addresses of the plurality of multi-position actuators in the group.

In another embodiment, the above method is modified through the use of broadcast commands in lieu of group commands, so that the method includes providing a command set for each of the plurality of multi-position actuators that includes for each command in the command set the assigned actuator address and one of a plurality of executable functions. The command set includes at least one command to realize one position value from a plurality of position values defined for the actuator. The command set further includes at least one stop command. The method further includes defining a plurality of broadcast commands that includes for each broadcast command the broadcast address of the plurality of actuators and one of a plurality of executable functions.

In still another embodiment, an autoleveling, remotely controlled multiple window shade positioner system is presented. The system includes a plurality of motorized window shade positioners, each including a wireless radio frequency transceiver assigned to a predetermined frequency band, a command decoder, a command address comparator, a polling reply message generator, a spoolable window shade, a window shade spool drive motor, and a calibratable position detector. The system further includes a control station, including a command generator, a wireless radio frequency transceiver assigned to the frequency band of the positioner transceivers, a command generator, and a polling reply data processor.

In yet another embodiment, an autoleveling, remotely controlled multiple-value positioner system is presented. The system includes a short-range radio transceiver-based network with a separate control station that provides bidirectional message transfer between the separate control station and each of a plurality of autonomous, processor-controlled, multi-position actuators, each of which has a corresponding transceiver. Each multi-position actuator includes support for retention of a processor-readable address, with the actuator addresses non-repeating within the plurality of multi-position actuators. Each of the plurality of multi-position actuators recognizes both its retained address and a plurality of executable function codes. The set of executable function codes includes at least one code commanding translation to one position value among a plurality of position values defined for the addressed actuator. The set of executable function codes further includes at least one stop command. The plurality of multi-position actuators are assignable to a group using assignment routines in the control station. The group is commandable by the control station by any group command associated with that group, with the group command including a plurality of discrete commands addressed to the actuators in the group, to perform a like executable function.

There have thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments, and of being practiced and carried out in various ways. It is also to be understood that the phraseology and terminology employed herein, as well as in the abstract, are for the purpose of description, and should not be regarded as limiting.

As such, those skilled in the art will appreciate that the conception upon which this disclosure is based may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

DETAILED DESCRIPTION

The invention will now be described with reference to the drawing figures, in which like reference numerals refer to like parts throughout. An embodiment in accordance with the present invention provides an improved barrier positioner control method for home automation, as well as apparatus in support thereof, wherein a basic scene command to a group of similar devices can compensate for variability in operation of the individual devices to present a uniform final appearance. Quantification, verification, and repeatability made possible by the present invention overcome producibility limitations intrinsic to earlier concepts.

Figure 1:
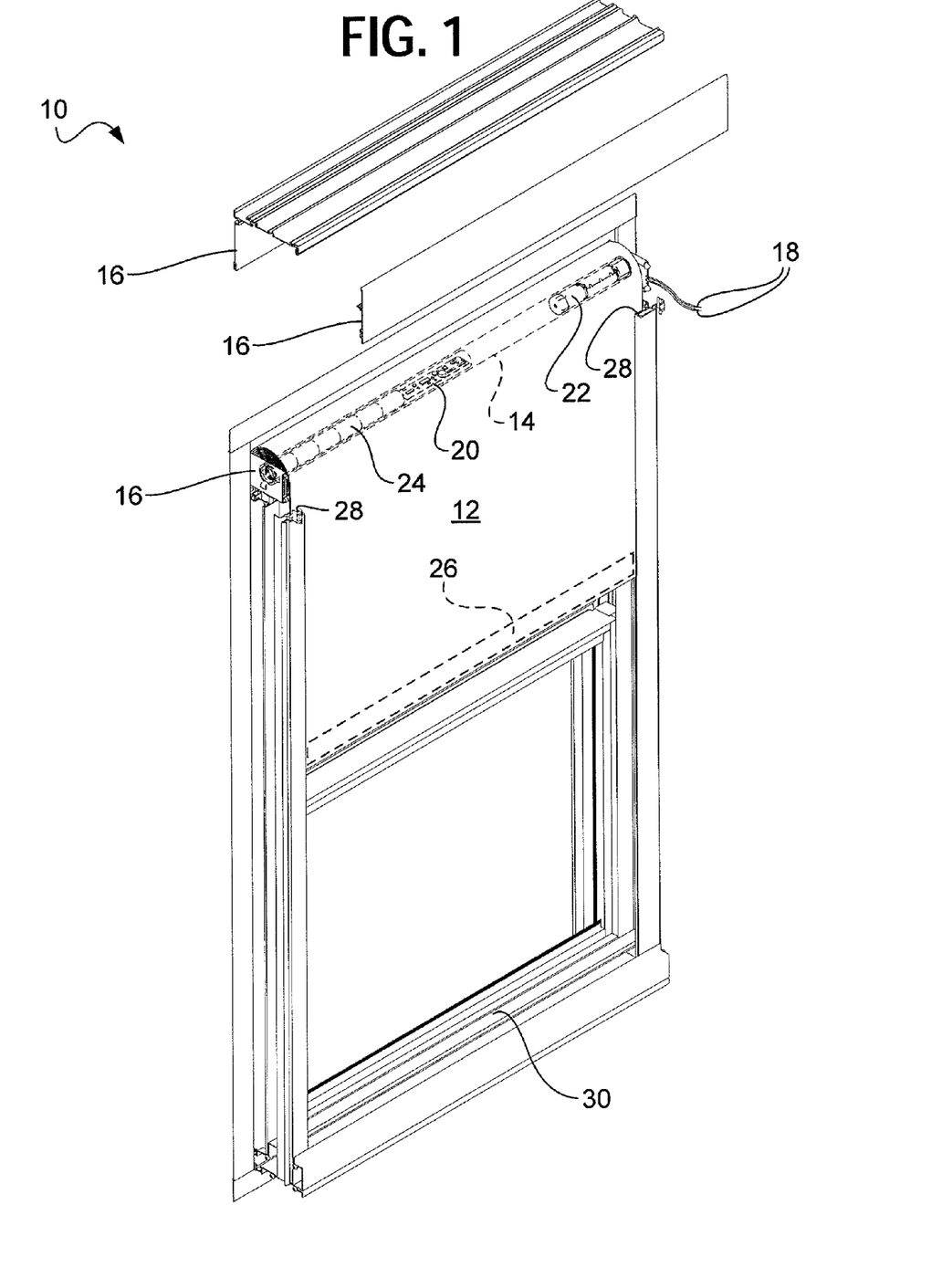
FIG. 1 is a perspective view of a single roller blind configured for remotely commanded operation in a home automation system.

FIG. 1 shows a roller blind 10, also termed a shade, compatible with use as a part of a home automation system. In addition to a flexible shading panel 12 that can be spooled and unspooled to provide and remove a barrier to light, in at least the senses of blocking visual exposure and obstructing illumination, the roller blind 10 includes a roller (equivalently termed a spool) 14 around which the panel 12 is wrapped in multiple layers when not providing a light barrier, and a housing 16, shown in part exploded, that supports the roller 14 at the ends thereof and permits attachment to a home structure. The roller blind 10 further includes a wiring provision 18 for applying electrical power for use by a controller 20 and by a motorized actuator such as an electric motor 22, in order to actuate the roller blind 10 without physical contact by a user. In some embodiments, the wiring provision 18 and/or the controller 20 may include a battery pack 24 for use as a primary or backup power source. A weighted shade end bar 26 may apply downward force to the panel 12. A top-of travel stop 28 may have the form of a slot as shown; a bottom-of-travel stop 30 may have the form of a simple window ledge.

The controller 20 of the apparatus of FIG. 1 may preferably support being commanded, for example, by a radio signal from a short-range transmitter or transceiver, within a finite effective working space, limited by the transmitted signal power, receive sensitivity, and characteristics of the associated antennas and the propagation environment, including an assigned frequency band of operation. Alternative command communication technologies, such as infrared or other optical transmission, ultrasonic or other acoustical transmission, utility (mains) power line signal transmission, and the like, may be preferred in other embodiments, with the understanding that technologies that support bidirectional and wireless communication may be preferred, and that realization of bidirectional data flow may introduce complexity or additional cost to some embodiments not based on well-defined wireless home automation control systems and existing channel spectra.

Figure 2:
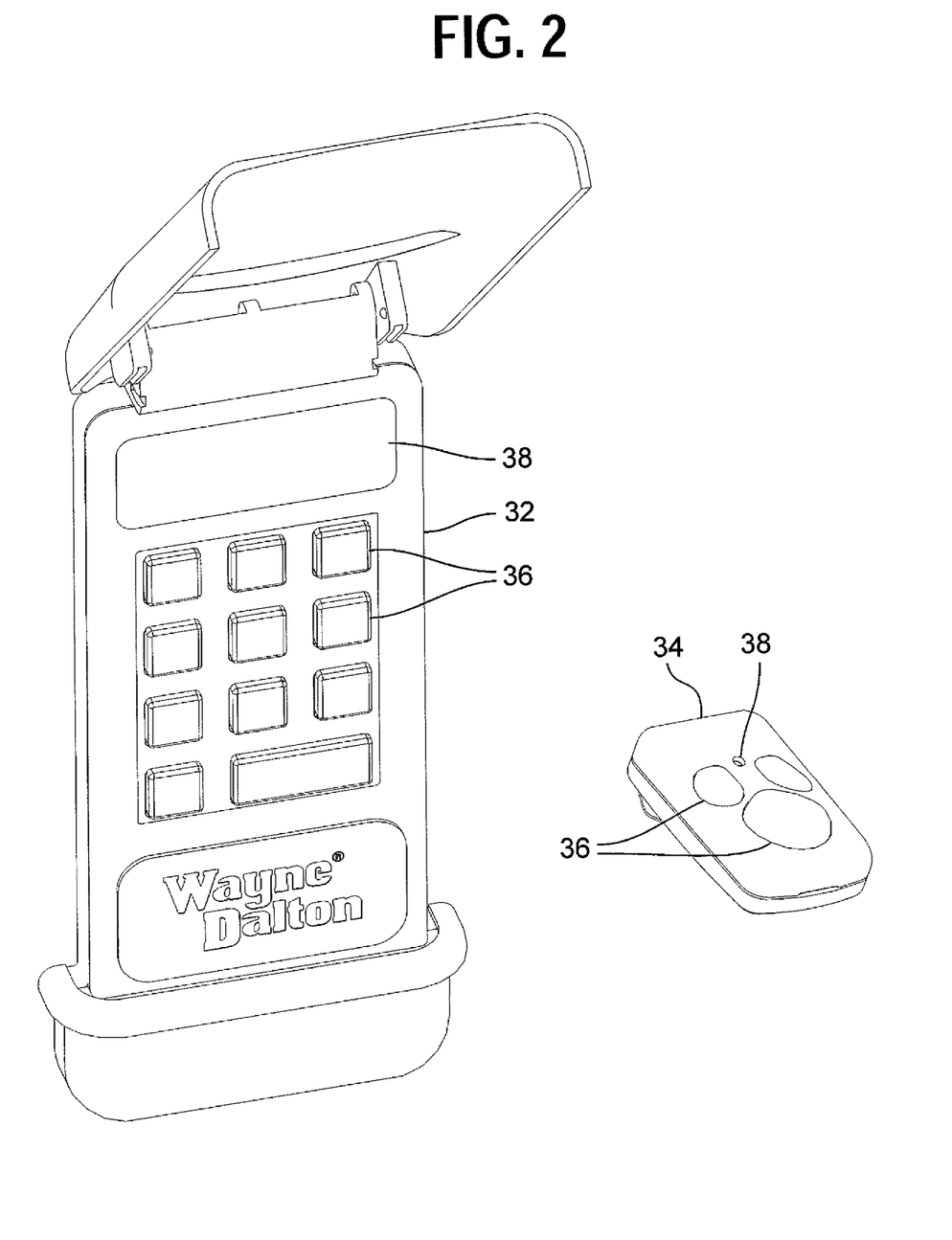
FIG. 2 is a perspective view of controller devices compatible with operation of multiple roller blinds of styles such as that shown in FIG. 1.

FIG. 2 shows enclosures for a fixed-base controller 32 and a hand-held remote 34 according to the present invention, superficially similar to many known styles of home automation controller apparatus, but incorporating functionality that makes one or the other capable of operating pluralities of the roller blinds 10 of FIG. 1, for example, according to the present invention. User interface and system control devices such as the controller 32 and remote 34 shown include discrete, fixed-assignment push buttons 36 as user interface elements in the embodiment shown. In other embodiments, the user interface elements may include specified touch-screen areas, slide bar input values, dynamically-defined push buttons associated with display elements, combinations of functions that provide mouse- or trackball-like functionality, or other interface forms. Either a controller 32 or a remote 34 may include a display portion 38, which may be limited to one or more lamps or to text or special symbol indication, or may provide more extensive information.

The wall-mount capability of the fixed-base controller 32 shown is peripheral to its function. Embodiments of such a controller 32 may be powered by self-contained primary or secondary batteries or through a utility (mains) source, which may be augmented at least in part by solar cells or other resources. In still other embodiments, user interface through a fixed-base controller 32 may be augmented by a personal digital assistant (PDA), a computer, or another communication unit configured to access a home automation network directly or indirectly.

In embodiments such as those shown, a broad-functionality fixed-base controller 32 may be configured to transmit commands to home automation-compatible devices such as the shades 10 shown in FIG. 1. Where a manufacturing process, initial programming, or system setup has established an address for each shade 10 that is retained within the controller 32, the commands may include, in at least some embodiments, such directions as "go up," "go down," "stop," "report position," "calibrate yourself," "go to position x," and the like for each shade 10. The inclusion of position-related commands implies adequate precision and measuring capability within each shade 10 to execute such commands. The remote 34 may communicate with the controller 32, or may communicate directly with home automation devices or groups thereof. A sparse display 36 and button 38 set in some embodiments of hand-held remotes 34 may dictate that a command set be structured in a particular fashion, such as assigning a single button to cycle through "start upward," "stop," "start downward," and again "stop," for a group of any size, with other functions reduced in availability through the remote 34.

It is to be understood that the calibration and precision motion control functions referred to above may require detector functions within each shade 10 or comparable device used in an application. Such detector functions may preferably include, as components, a shaft angle transducer, such as an encoder that may be integral with the motor 22 in some embodiments, a shaft angle telemetry storage element, such as a memory location maintained by a processor portion of the controller 20 in the shade 10, and the weighted shade end bar 26, similar to ordinary wooden bars in spring-powered roller blinds but thicker and/or heavier in some embodiments to provide increased stabilizing downward force. The detector function may further include a shade retraction end-of-travel stop 28, such as a slot through which the flexible shading panel 12 passes freely but which blocks the bar 26, and a shade extension end-of-travel stop, which may be as simple as a window ledge 30 struck by the bar 26 when fully extended. Use of these styles of stops 28, 30 may require that current applied by the controller 20 to the motor 22 be monitored with precision, so that detection of motor 22 overcurrent may be interpreted as the shading panel 12 having retracted to the retraction end-of-travel stop 28, while motor 22 undercurrent may be interpreted as the shading panel 12 having extended to the extension end-of-travel stop 30.

The above apparatus supports positioning a constant-length shading panel 12 with reference to a window or other panel. Further calibration may include a processor 20 function within the shade 10, such as using a scaling algorithm to correlate the output pulse count range of an encoder (more generally, the value range of a shaft angle or other position transducer) to a realizable range of motion of the flexible shading panel 12. Such a scaling algorithm may allow computing with some precision the absolute extent of payout, or scope, of the flexible shading panel 12.

Scope and scaling data may be volatile in some embodiments that employ it, requiring calibrating the actuation mechanism driven by the motor 22 in the roller blinds 10 after a power initialization. Some embodiments may calibrate automatically during each initialization after power loss by driving the flexible shading panel 12 or any other movable elements of each roller blind 10 directly to, for example, a fully-retracted position, then to an opposite position, such as a fully-extended position, capturing during this process both a zero point and a range of traverse, such as a maximum encoder count, and storing in each shade 10 calibration values for a start point and range of traverse. Positioning commands may be based directly on transducer values or may be subject to scaling. It may be noted that strictly battery-powered embodiments can change in speed as a function of battery 24 condition, although contemporary high-efficiency regulators can adjust battery 24 discharge rate over a wide range of battery 24 condition in lieu of permitting variation in motor 22 speed. Certain motor designs, such as stepper motors, may detect position with considerable accuracy as a function of drive pulse count and sensing ends of travel by current/voltage phasing, for example, while obviating separate transducers.

Figure 3:
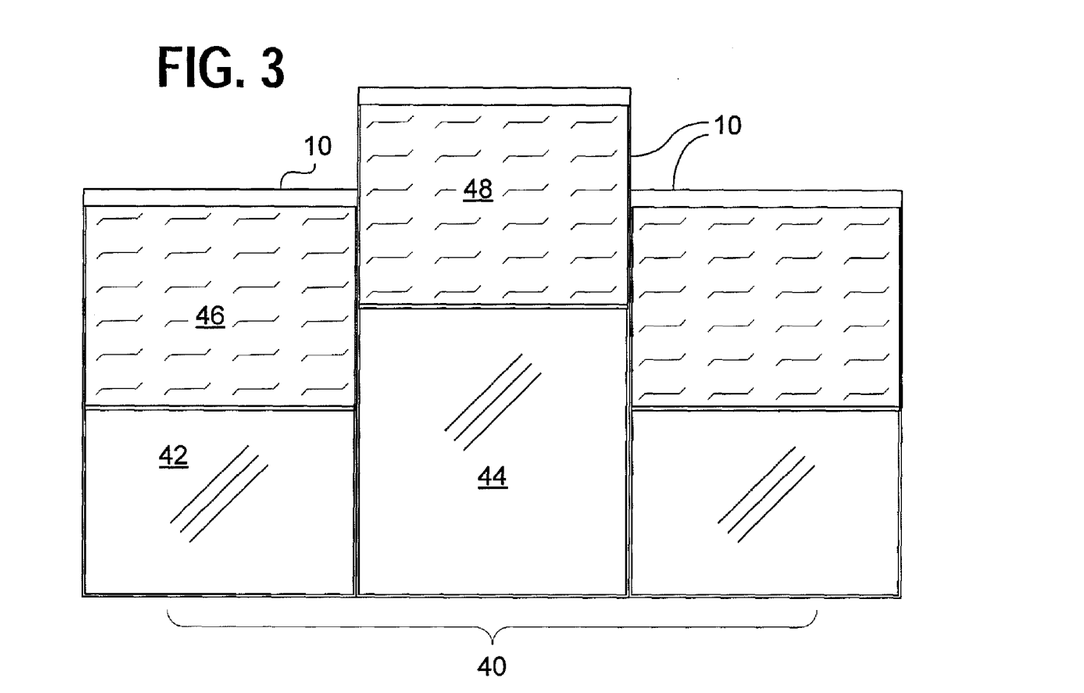
FIG. 3 is a first graphical representation of multiple roller blinds commanded from a common control unit, according to the prior art.

FIG. 3 shows a prior-art compatible configuration of several shades 10, whereof the flexible shading panels 46, 48 can be translated as a group 40 to a different height, such as to implement a part of a "scene" as defined in applicable Z-Wave® (© Zensys® Corporation) specification documents. As illustrated in FIG. 3, the heights of individual windows 42, 44 may not be similar, and the result of a fixed time-of-run command directed to a group 40, whether manual or automatic, may result in uneven extension of the respective shading panels 46, 48. Correction of such uneven positioning, herein termed leveling, may require a user to direct individual motion commands to the respective shades 10.

Figure 4:
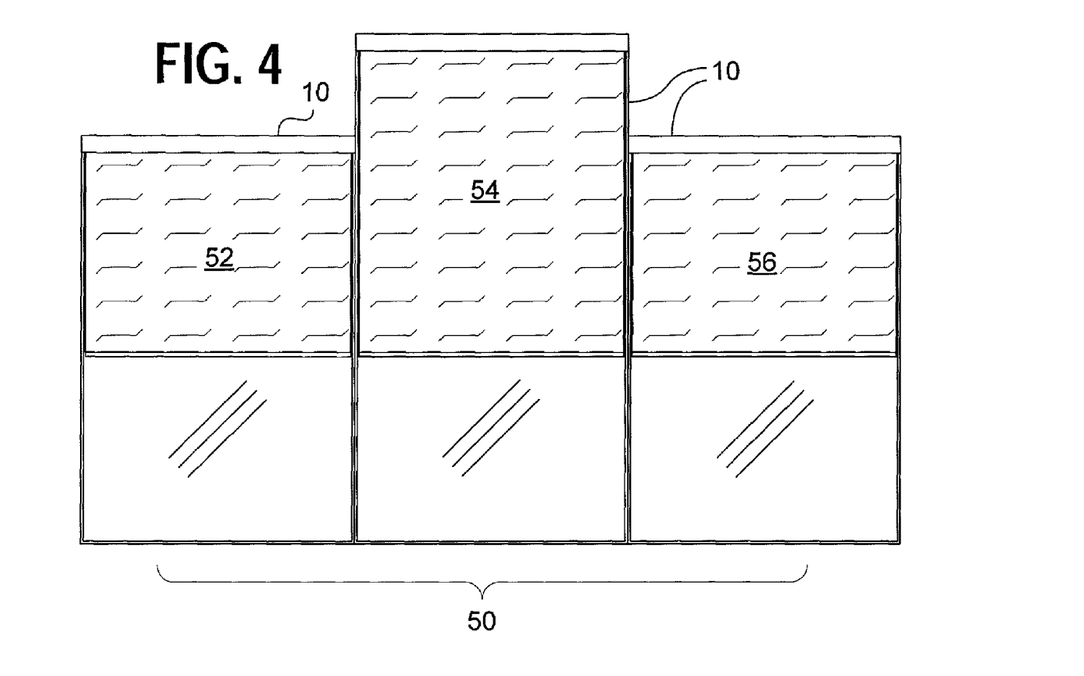
FIG. 4 is a second graphical representation of multiple roller blinds commanded from a common control unit, controlled using the processes of the present invention.

FIG. 4 shows several shades 10 that are compatible with receiving and executing commands issued by a home automation controller 32 or 34 of FIG. 2, and incorporating the present invention. Embodiments incorporating the present invention realize a uniform group positioning function, herein termed autoleveling, according to at least one of the positioning modes described herein. It is to be understood that the term autoleveling may refer to relative height, as in the roller blinds 10 shown in FIG. 4, and may equally refer to relative lateral, angular, or other physical displacement, or to relative temperature, motor speed, sound level, air flow rate, etc.

In one positioning mode, a manual actuation by a user with a fixed-base controller 32 or a hand-held remote 34 commands all of the shades 10 in a group 50 to start to translate in an up or down direction. At a subsequent time, the user commands the group 50 to stop. The present invention thereupon polls the group members 52, 54, 56, that is, it issues a series of position inquiries from the remote 34 or the fixed-base controller 32 to the group members 52, 54, 56. Each of the group members 52, 54, 56 responds by transmitting a present position value based on measurements acquired as described above. The present invention compares these position values, then issues discrete commands to the respective group members 52, 54, 56 to further translate to one of the position values just received. The selected position value may be established according to a rule, such as by assuming that a user will preferentially halt a process when a first of the group members 52, 54, 56—in effect, a leader—has reached a user-desired position. It may be observed that one or more members of the group will receive a command to translate to the position already occupied; this can be a known function for a device configured for operation in a home automation control environment, and may allow simplification of the procedure steps—the controller compares all of the devices, and, based on the commanded direction of travel, finds the most-extended or least-extended position value and commands all shades 10 to that position. In some embodiments, it may be preferred to issue commands only to the shade 10 that need to move further to reach a uniform position.

In other embodiments, scaling may be required before comparison and before command issuance in order to achieve a common height, or a preferred differential height may be commanded. For example, observing that a window and its shading panel 54 are taller (or shorter in other cases) than others in a group, it may be desired to have all of the group members 52, 54, 56 move together over the common part of their range, with any odd units either stopping or continuing to respective end-of-travel positions after the others have stopped. If calibration for the devices is based on end-to-end measurement, and position values are based on percentage of travel, for example, then commands can combine offset and scaling to provide a final result. Values of offset as well as origin and scaling may be computed and/or stored within each roller blind 52, 54, 56, or within a controller 32, 34. Programming in support of assigning one or more offset values to one or more of the roller blinds 52, 54, 56 and management of the combined positioning instructions according to the present invention can likewise reside within each roller blind 52, 54, 56, or within the fixed-base controller 32 or hand-held remote 34.

If a group member 52, 54, or 56 has reached end of travel (fully extended or fully retracted) before the stop command is issued, that group member 52, 54, or 56 may be excluded from the comparison routine in some embodiments, such as by omitting 0% and/or 100% values from the comparison, which can ensure positioning away from one or both ends of travel by default. In other embodiments, ends of travel may be treated as regular positions.

In a second positioning mode, substantially all functionality may be equivalent to that in the first mode except that a push-and-hold operation applied to a button 36 or equivalent user interface element is required in order to cause the group 50 to continue to move, and release of the button 36 or equivalent results in a halt and the above-described after-halt position adjustment.

In a third positioning mode, a command function other than a manual user input may accomplish an equivalent position adjustment. In a first case consistent with this mode, a scene may include a brightness level in a room, detected by a photoreceptor module integrated into a home automation system, with the brightness level to be realized in part by opening roller blinds 10 part way if possible. In this case, a photoreceptor-referring command may be issued to start to change the heights of the group members 52, 54, 56. When the intended light level is achieved (at a startup event for operation in this mode) or restored (after a change in available light, such as from sun motion or cloud cover, and typically after a fixed minimum time interval has passed), a preliminary halt directed by passing a threshold from the photoreceptor may be followed by the above-described polling and subsequent issuance of an adjustment command. Hysteresis in the control system and moderate uniformity in the actions of the group members 52, 54, 56 allow a single adjustment of position to be applied. Where system function is less well tuned, a first adjustment that exceeds the tolerance range for the photoreceptor module can trigger a second commanded positioning activity followed by a second polling and adjustment step. Readjustment of a system function such as that described in this case can occur as often as needed or at time intervals permitted by the controller 32.

Where system limits are subject to being exceeded, such as in the above case if no amount of shade 10 repositioning can realize an intended light level, additional process stages can be appended. For example, a scene may activate interior lighting if maximum shade 10 opening fails to introduce enough light, and may further readjust or close the shades 10. Time-of-day and seasonal factors may likewise be incorporated into such a scene calculation, for example to determine whether or when to attempt subsequent reopening of the shades 10 to provide the desired light level from natural sources. Previous knowledge, such as that interior lighting cannot reach a sunlight-keyed threshold, may be programmed into the scene to advance from the previous scene configuration, invoking a second threshold.

Similarly, the control process may be used for functions other than flexible shading panel 12 positioning: if a scene calls for temperature and/or humidity regulation to include natural climate sources, for example, then any combination of opening and closing of windows, activating of variable-speed ventilation fans, combining heating and cooling to remove moisture, extending and retracting variable-position awnings, and the like may involve polling and issuing successive commands in response to feedback to establish a desired uniformity of appearance or function.

A control system maintaining conditions in multiple rooms in a home, school, office building, or the like may monitor one or more criteria for each of the rooms, operating available variable-value actuators to regulate each independently, particularly in view of changes in outdoor conditions over the course of a day or a season. For example, using at least one thermostat-style temperature sensor, in a room having a plurality of multi-speed or variable-speed ceiling fans with state feedback, the control system can set the fans to blow up or down at a common rate, adjust the rate as temperature shifts over a day, coordinate fan function with window and shade function, and the like. Where fan speed is substantially continuously variable, such as over a finely stepped digital command range, realized speed for each fan may differ from a command-signal speed reference, so that a compensation table or a calibration function may be required for each fan in order to regulate all fans within a group to an effectively uniform speed and/or acoustic signature.

In another exemplary embodiment, closer to the basic application strategy, a window covering system may include a row of upward-raised shades and a row of downward-lowered shades, with the spools of the respective rows vertically proximal. In such an arrangement, users may view from lower windows, or may admit light through upper windows while maintaining privacy by keeping the lower row of shades fully closed. Adjusting the shades in each row to a uniform appearance may be performed automatically using the invention. By extension, any number of groups of actuators may be autoleveled or otherwise reconciled to a uniform state within each group using the invention.

Figure 5:
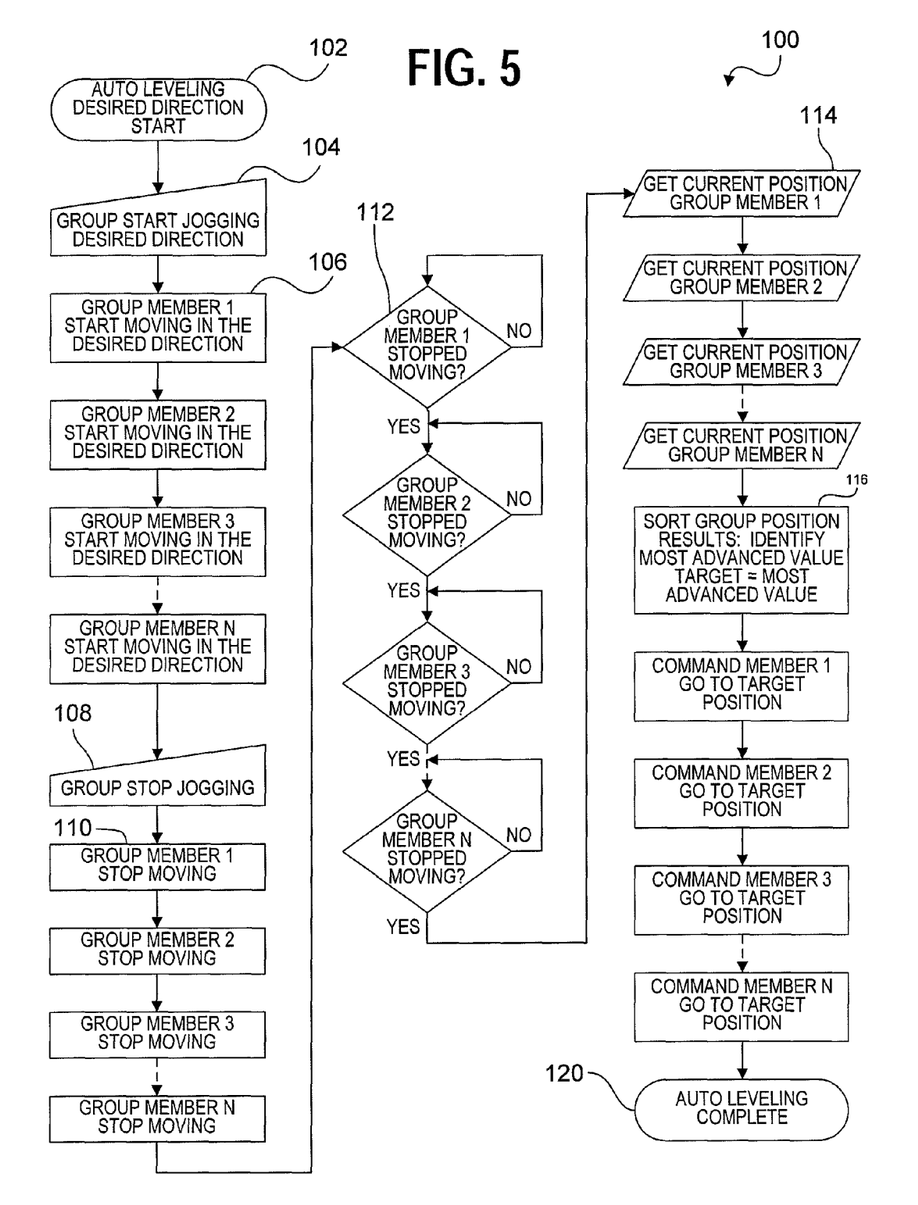
FIG. 5 is a first flow chart representing operation in accordance with the present invention.

FIG. 5 is a flowchart 100 showing representative manually-activated process flow for an embodiment of the present invention. After initialization 102, a first motion command 104 from a user-operated control device orders that a previously-defined group of N distinct elements begin 106 and continue to move in a chosen direction—i.e., apply power to the respective motors of the group members in such a way as to cause the respective window shades of the group in the embodiment shown to all move up or down as determined by an input external to the command. As previously addressed, such a group may be of any size. Processes for identifying or defining such a group are addressed in references such as U.S. patent application Ser. No. 12/191,912, filed Aug. 14, 2008, and incorporated herein by reference in its entirety.

After an indeterminate period, as decided by and under the control of a user, a second motion command 108 orders that all N group members stop 110 the motion previously initiated. In the embodiment shown, the motion begin process 106 and the motion stop process 110 take the form of commands issued by the controller 32 to the individual, autonomous members of the group, each of which is a transceiver-equipped roller blind 10. Since starting each motor in response to a command may take an uncertain amount of time and begins an open-ended process, confirmation of starting may not be critical, and is not shown in this embodiment. Completion of the stopping operation, however, determines when the next process may begin. As a consequence, the embodiment monitors group stopping 112, by a process represented as a series of tight loops blocking execution of subsequent processes.

It is to be understood that numerous alternative programming procedures are equivalent to the series of tight loops 112 shown, so that the process should be viewed as representative and not limiting. For example, the group members, roller blinds 10, may be configured to transmit an echo in response to each received command and to report each status change, such as "started moving up" or "finished stopping", so that replies from all members arrive at the controller 32 for each start command, each startup event, each stop command, and each stop event. The controller 32 may then filter these messages for the ones needed in realizing the present invention. If the controller 32 functionality for the present invention is interrupt driven, then the process of waiting for all group member stop reports may be intrinsic, albeit operationally equivalent to the tight loops 112 shown. Such a routine can confirm group members that report and can perform further tests such as timing errors during execution. In still other embodiments, a group address may be definable, allowing the controller 32 to broadcast a single command for each of starting 104 and stopping 108 in lieu of the multiple commands shown. System design for classes of commands may further determine whether outgoing group commands result in confirmations, as well as communication protocols such as collision control.

The embodiment may assume by default that each such group member is operational. The controller 32 can include functionality to assess group member state of health, a process substantially independent of the present invention.

Following confirmation of stopping 112, the process in the embodiment shown includes polling 114 to determine the current position of each group member. As indicated above, alternative embodiments may be realized; in some of these, position reporting may be automatic as a part of a status change report message, so that separate polling 114 for position can be limited to data loss or timeout conditions. Thus the process shown is not to be viewed as limiting.

Once the accumulated group element position data is available to the controller 32, the extreme among the group is identified 116 by a process identified herein as sorting. If each group member is a positioner, as characterized in the embodiment shown, and includes a measuring capability, such as with an electric motor 22 coupled to both the flexible shading panel 12 and a rotary encoder providing a direction-flagged series of pulses corresponding to panel extension, then the motor controller 20 may hold a datum that has a maximum value when the panel 12 is fully extended and a minimum value when the panel 12 is fully retracted, for example. In such embodiments, the sort function 116 may be as simple as configuring the controller 32 to receive successive poll 114 results and retain only the desired extreme value, either the lowest value, representing the most retracted shading panel 12, or the highest value, representing the most extended shading panel 12, as desired for the function.

Following determination of the "most advanced" value among the group members, which is defined as the preferred value by the default logic indicated, the controller 32 can transmit individual fixed-destination motion commands 118 to the respective group members, which are configurable to move autonomously to the indicated position. Zero-motion commands, that is, commands to group members that direct them to locations currently occupied, may be assumed to be defined and harmless to the affected group members, so that the controller 32 need not screen previous position reports to avoid such transmissions. Following issuance of the fixed-destination motion commands 118, the user-controlled auto leveling group opening routine of FIG. 5 has reached termination 120.

It is to be observed that an extent of time to execute the described position alignment depends on the processing speed of the electronic devices involved and on characteristics of the communication system employed. In substantially all anticipated systems, each such function is likely to be performed in a small fraction of a second, so that a perception of a pause between panel 12 stopping and panel 12 restarting following user stop input 112 is likely to be minimally perceptible to a user, although readily detectable by suitable instrumentation. Time to reach final alignment depends on properties of the window shade 10 drive systems, including panel 12 inertia (angular momentum), extension distance (off-balance weight), motor power, extent of discrepancy between group member positions, and details of the start/stop algorithm used by the respective shade controllers 20 in an embodiment, as well as state of battery charge in battery-powered equipment.

Figure 6:
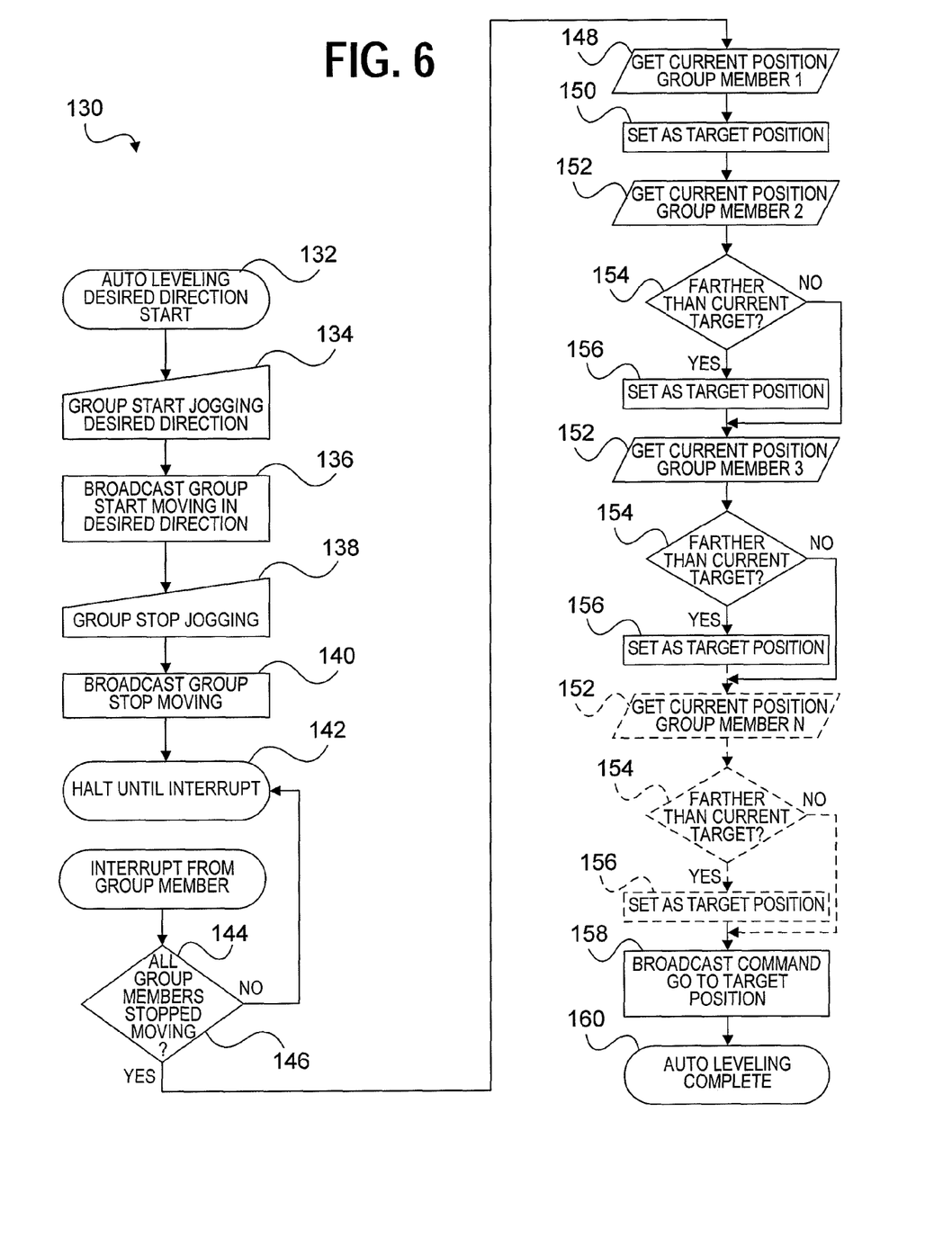
FIG. 6 is a second flow chart representing operation in accordance with the present invention.

FIG. 6 illustrates in flow chart 130 form a second embodiment of the present invention, supporting broadcast communication in addition to or in lieu of defining groups and addressing the individual elements of the groups. The controller 32 and/or hand-held remote 34 supports a broadcast mode, wherein commands are recognized by individuals configured as members of a broadcast group. Following initialization 132, a single broadcast command 134 directs all group devices to begin translation in a chosen direction 136. The user subsequently commands the group to stop 138 at a selected location. In the embodiment shown, interrupt based software architecture is employed, so following the broadcast 140 of the stop command, the system waits for interrupts from all group members 142. Each interrupt 144 restarts a service routine; once all group members are accounted for 146, the controller polls for a first group member's position 148, stores this as the default target value 150, then continues to poll each remaining group member 152, replacing the current target value 156 with the newly acquired one 154 if it represents greater travel. Once all values are acquired and this de facto sort is completed, the residual value is the target. This target value is thereupon broadcast to all group members 158. At this juncture, execution is complete 160 for at least some embodiments. In other embodiments, status reports may be provided by the group members as a default action. In these embodiments, a final verification and/or position adjustment may be performed prior to completion 160, functionally equivalent to that described above for FIG. 5 at steps 114, 116, and 118.

Position sensor technologies are numerous; neither the shaft encoder nor the stepper motor referred to above should be viewed as limiting. Optical, sonar, tilt sensor, and radar type devices are well known and may be sufficiently useful and cost effective to be desirable in some embodiments. Tilt sensors, for example, attached to arms of an awning, and optical or sonar-based sensors attached to a fan fold or so-called cellular blind, are embodiments that may be suited to applications that do not extend and retract fabric shade material using motorized rollers. In addition, less widely applied technologies such as surface-acoustic-wave (SAW) devices—these can transmit pulses that travel along a strip-form device and produce detectable reflections from discontinuities in propagation characteristics caused by phenomena such as bends or partial immersion—can be effective if joined to shade fabric and spooled with the shade, with the transmitter/detector embedded in the spool, coupled through the pivot shaft, or the like, or if used for other applications. All known and future physical property sensing technologies capable of application to the present invention are subject to use.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

What is claimed is:

1. A method for operating a plurality of autonomous, processor-controlled, multi-position actuators from a separate control station, comprising:

establishing a wireless communication network that originates with the separate control station and provides bidirectional message transfer between the separate control station and each multi-position actuator;

assigning a processor-readable address to each multi-position actuator;

providing a command set for each multi-position actuator that includes for each command in the command set the assigned actuator address and one of a plurality of executable functions, wherein the command set further includes at least one command to realize one position value from a plurality of position values defined for the respective actuator, and wherein the command set further includes at least one stop command;

assigning each of the multi-position actuators to a group;

defining a plurality of group commands, including in each group command a plurality of discrete commands to perform a like executable function, directed to the addresses of the plurality of multi-position actuators in the group;

processing a current position of each of the multi-position actuators; and equalizing a position of a group of barriers associated with the group of multi-position actuators.

2. The method of claim 1, further comprising:

issuing a group command other than a stop command to the actuator group;

delaying for a time interval sufficient to realize a selected actuator position;

issuing a stop command to the group;

determining the respective positions realized by the multi-position actuators through execution of the group command;

identifying a position value among the respective position values realized by the actuators; and issuing a group command to realize the identified position value.

3. The method of claim 1, wherein establishing the communication network further comprises:

incorporating a transceiver and associated antenna into the control station; and incorporating a transceiver and associated antenna into each multi-position actuator in the plurality of actuators in the group.

4. The method of claim 1, wherein assigning a non-repeating processor-readable address to each multi-position actuator further comprises:

selecting a range of addresses for communication between the control station and the processor-controlled actuators; and associating a unique one of the range of addresses with a message address decoding and encoding function within each of the multi-position actuator processors.

5. The method of claim 1, wherein providing a command set for each multi-position actuator further comprises:

defining an actuator command for actuation in a first mode, including a first combination of range, rate, and duration of motion;

defining an actuator command for actuation in a second mode, including a second combination of range, rate, and duration of motion; and defining an actuator command for stopping motion.

6. The method of claim 1, further comprising:

calibrating the actuators after power application by driving at least one movable element of each thereof directly to a first fully traversed position and a second fully traversed position, opposite thereto, including sensing a quantified value for a range of traverse of each actuator movable element; and storing in each actuator the calibration value for the range of traverse of each movable element thereof.

7. An autoleveling, remotely controlled multiple-value positioner system, comprising:

means for establishing a wireless communication network that originates with a separate control station and provides bidirectional message transfer between the separate control station and each of a plurality of autonomous, processor-controlled, multi-position actuators;

means for retaining a processor-readable address within each multi-position actuator, non-repeating within the plurality of multi-position actuators;

means for commanding each of the multi-position actuators that includes for each means for commanding in a set thereof a retained actuator address and one of a plurality of executable function codes, wherein the set of means for commanding includes at least one means for realizing one position value defined for an addressed actuator, and wherein the set of means for commanding further includes at least one stop command;

means for assigning each of the multi-position actuators to a group;

means for commanding the group, including in each means for commanding the group a plurality of means for commanding discrete actuators of the group to perform a like executable function, directed to the addresses of the plurality of actuators in the group;

means for processing a current position of each of the multi-position actuators; and means for equalizing a position of a group of barriers associated with the group of multi-position actuators.

8. The positioner system of claim 7, further comprising:

means for commanding the actuator group to move in a selected direction;

means for delaying for a time interval sufficient to realize a selected actuator position;

means for commanding the group to stop;

means for determining the respective positions realized by the multi-position actuators;

means for identifying a greatest position value among the respective position values realized by the actuators; and means for commanding the group to advance to the identified greatest position value.

9. The positioner system of claim 8, wherein the actuators determine the positions of barriers.

10. The positioner system of claim 8, wherein the actuators determine the positions of awnings.

11. The positioner system of claim 8, wherein the actuators determine the positions of both an upward-moving group and a downward-moving group, wherein the respective groups originate from a substantially common location proximal to an intermediate location.

12. The positioner system of claim 7, further comprising:

means for commanding the actuator group to adjust the rates of variable-speed ventilation fans in a selected direction;

means for delaying for a time interval sufficient to realize a selected fan rate;

means for commanding the group to stop adjusting;

means for determining the rates realized by the respective fans;

means for identifying a most changed rate among the respective fan rates realized by the actuators; and means for commanding the group to advance to the identified most changed rate value.

* * * * *